United States Patent [19]

Alexius

[11] Patent Number: 4,477,056
[45] Date of Patent: Oct. 16, 1984

[54] HIGH FORCE-GAIN VALVE
[75] Inventor: Richard C. Alexius, Orlando, Fla.
[73] Assignee: Martin Marietta Corporation, Bethesda, Md.
[21] Appl. No.: 470,810
[22] Filed: Feb. 28, 1983
[51] Int. Cl.³ ............................................. F16K 39/04
[52] U.S. Cl. ................................... 251/282; 251/319
[58] Field of Search .............. 251/282, 319, 322, 323, 251/326; 137/505.18, 219

[56] References Cited

U.S. PATENT DOCUMENTS

| | | | |
|---|---|---|---|
| 642,039 | 1/1900 | Garrels | 251/282 |
| 1,649,953 | 11/1927 | Ernst . | |
| 1,729,802 | 10/1929 | Smith | 251/323 |
| 1,752,439 | 4/1930 | Larner | 137/219 |
| 2,087,037 | 7/1937 | McCarthy | 251/282 |
| 2,638,108 | 5/1953 | Williams et al. | 251/323 |
| 2,921,603 | 1/1960 | Lofink | 137/625.38 |
| 3,121,444 | 2/1964 | Bering | 137/432 |
| 3,601,147 | 8/1971 | Myers | 137/484.2 |
| 3,680,832 | 8/1972 | Uliczky | 251/282 |
| 3,892,384 | 7/1975 | Myers | 251/282 |
| 4,004,605 | 1/1977 | Rakcevic | 137/219 |
| 4,351,353 | 9/1982 | Filidoro et al. | 251/282 |

Primary Examiner—Martin P. Schwadron
Assistant Examiner—Sherl Novack
Attorney, Agent, or Firm—Patrick M. Hogan; William J. Iseman; Gay Chin

[57] ABSTRACT

A high force-gain valve including a housing having first and second openings therein, a fluid diverter fixed in position within the housing and aligned with the second opening, a translatable gate closely surrounding the diverter and having a sealing edge which in the closed position seats against the portion of the housing adjacent the second opening, and a positioner for translating the gate between open and closed positions. The gate is hollow, its interior being in fluid communication with the interior of the housing, and has a beveled sealing edge, exposing most of the sealing edge to the fluid pressure within the housing, and is therefore force balanced. The force balancing permits the gate to be easily and quickly translated and positioned between the open and closed positions.

8 Claims, 9 Drawing Figures

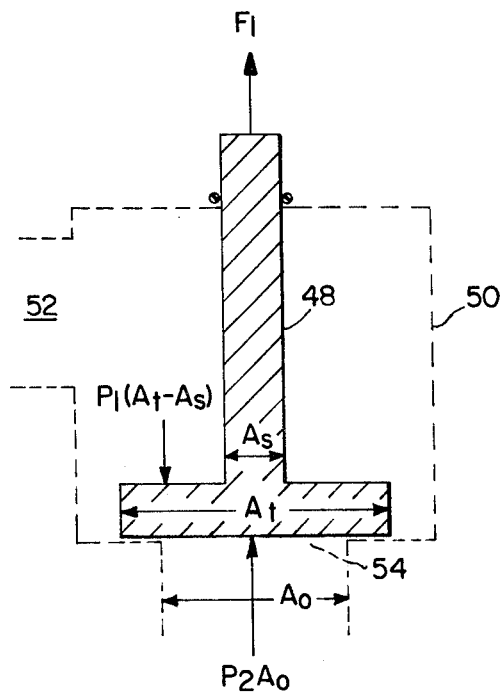
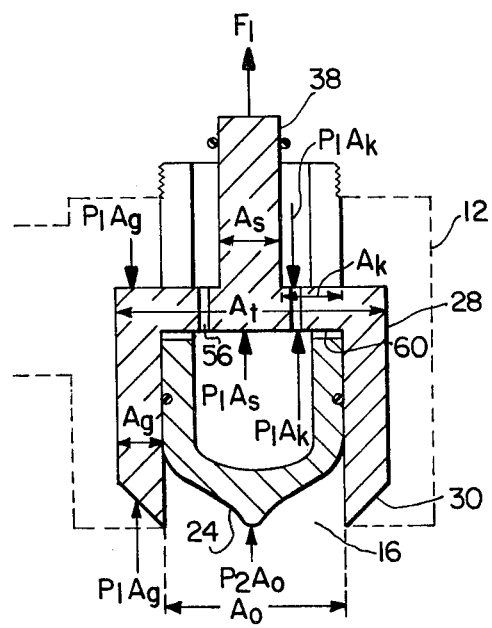
FIG. 3    FIG. 4
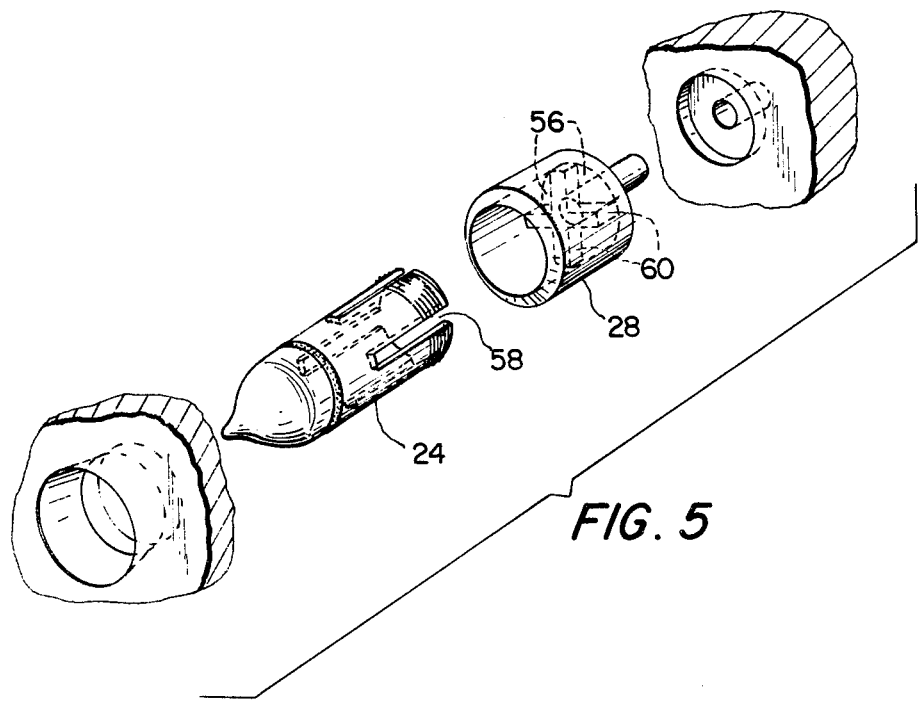
FIG. 5

HIGH FORCE-GAIN VALVE

The Government has rights in this invention pursuant to Contract No. DASG60-78-C-0080 awarded by the Department of the Army.

BACKGROUND OF THE INVENTION

1. Field of the Invention

This invention relates to valves and particularly to a new and improved high force-gain valve which is inherently force balanced to permit quick and easy opening and closing thereof.

2. Description of the Prior Art

Many different types of valves are used to control the flow of fluids. Particular difficulties can arise, however, in valves which are employed to control fluid under high pressure. Force-gain can be defined as the ratio of the output force to the input force. Many typically-configured prior art valves have low force-gain in which a relatively powerful actuator is required to overcome the force of the high pressure fluid to which the valve component which varies the fluid flow is exposed. For example, in a typical poppet valve having a force-gain of only 1.5, the actuator would have to supply a 2,000 pound force in order to open a one square inch poppet against a 3,000 psi fluid. In addition to being expensive and bulky, such powerful actuators are heavy, a disadvantage where overall valve weight is an important factor, such as in aircraft or guided missile applications. Further, the necessity of such a powerful actuator eliminates from the choice of potential actuator types the typically smaller, lower powered and less expensive actuators, such as solenoids and cams.

Certain valve applications may also require quick opening, closing and precise positioning of the valve. For example, valves used as directional control thrusters in missile propulsion and control systems necessitate precisely timed, short bursts of high pressure fluid from the valves. The bulky, powerful actuators described earlier used in many prior art valves to control the flow of high pressure fluid, however, do not lend themselves to quick opening and closing as do the lower powered actuators, such as solenoids and small servoactuators. Thus, fast reaction can be difficult to achieve in a high pressure valve.

In view of the above mentioned problems, it is therefore an object of the present invention to provide a valve which is configured to control the flow of high pressure fluid using a relatively low powered actuator.

Another object of the present invention is to provide a valve for high pressure fluid which can be quickly opened and closed and precisely positioned to intermediate positions.

Yet another object of the present invention is to provide a valve for high pressure fluid which is lightweight and relatively inexpensive.

SUMMARY OF THE INVENTION

The present invention, in accordance with one embodiment thereof, comprises a high force-gain valve employed to control the flow of a fluid therethrough. The valve includes a housing having first and second openings, one of the openings being in fluid communication with a source of fluid, and a fluid diverter fixed in position within the housing and aligned with the second opening. A gate having a force balanced configuration is also disposed within the housing closely surrounding the diverter. The gate is translatable between open and closed positions and includes a sealing edge which, when the gate is in the closed position, seats against the portion of the housing adjacent the second opening to block the flow of fluid therethrough. The valve also includes actuation means for effecting translation of the gate between open and closed positions.

In a particular embodiment of the invention, a portion of the housing comprises a nozzle, the second opening comprising the entrance of the nozzle. The force balancing of the gate is facilitated by the gate being hollow and in fluid communication with the interior of the housing and by its having a beveled sealing edge.

BRIEF DESCRIPTION OF THE DRAWING

The invention will be better understood from the following description taken in conjunction with the accompanying drawing wherein:

FIG. 3 is a cross-sectional view of a prior art poppet valve.

FIG. 4 is a cross-sectional view of the gate and diverter of the valve of the present invention showing the force balancing areas and pressures thereof.

FIG. 5 is a perspective view of the slots in the diverter and ribs in the gate.

DESCRIPTION OF THE PREFERRED EMBODIMENT

Figure 1:
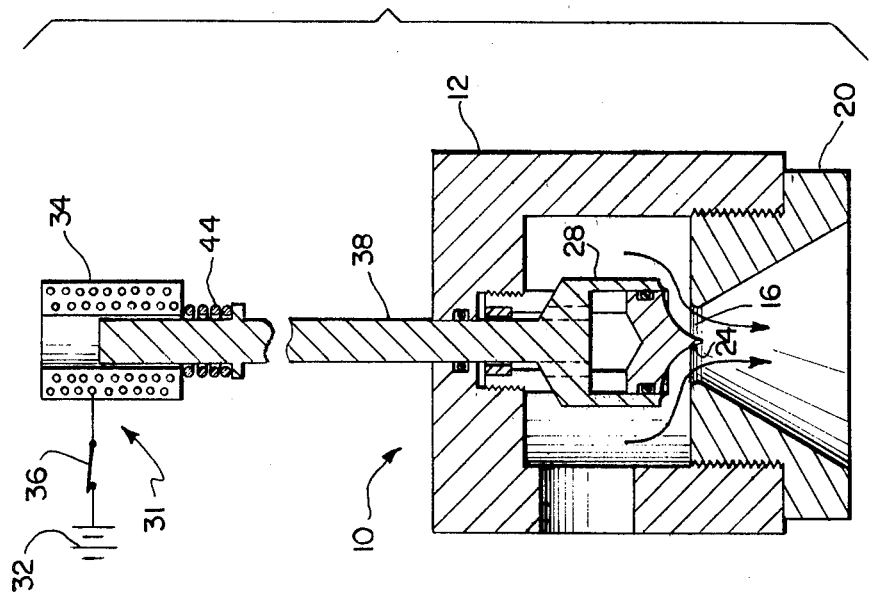
FIG. 1 is a cross-sectional view of the high force-gain valve of the present invention showing the gate in the closed position.

Turning now to a consideration of the drawing, and in particular to FIG. 1, there is shown a high force-gain valve 10 of the present invention which is employed to control the flow of a fluid therethrough. The valve 10 includes a housing 12 which has at least a first opening 14 and a second opening 16. One of the openings, in this case the first opening 14, is in fluid communication with a source of fluid. such as an inlet hose 18 shown in dashed lines. In the configuration shown in FIG. 1, the valve 10 is used as a control thruster and therefore a portion of the housing 12 comprises a nozzle 20 which is attached to the remainder of the housing 12 in an appropriate manner, such as with a threaded screw arrangement. As can be seen, the second opening 16 comprises the entrance 22 of the nozzle 20. Of course, the valve 10 can have many other uses and thus the housing 20 can have any shape appropriate to such uses.

The valve 10 includes a fluid diverter 24 fixed in position and disposed within the housing 12. The diverter 24 is shaped to divert, or direct, the fluid flowing through the second opening 16 and is thus aligned with and spaced from the second opening. In the configuration of FIG. 1, the diverter 24 is generally cone shaped with the pointed center portion of the diverter extending into the nozzle 20 beyond the entrance 22. The shape of the diverter, however, can be modified as desired.

Preferably, the diverter 24 is attached to the housing 12 in a manner so as to provide an unobstructed fluid flowpath through the second opening 16. For example, the diverter 24 can include an extension 26 having a threaded end which screws into a corresponding threaded section of the housing 12. Thus, no support structures extend through the second opening which might interfere with the fluid flow.

Figure 2:
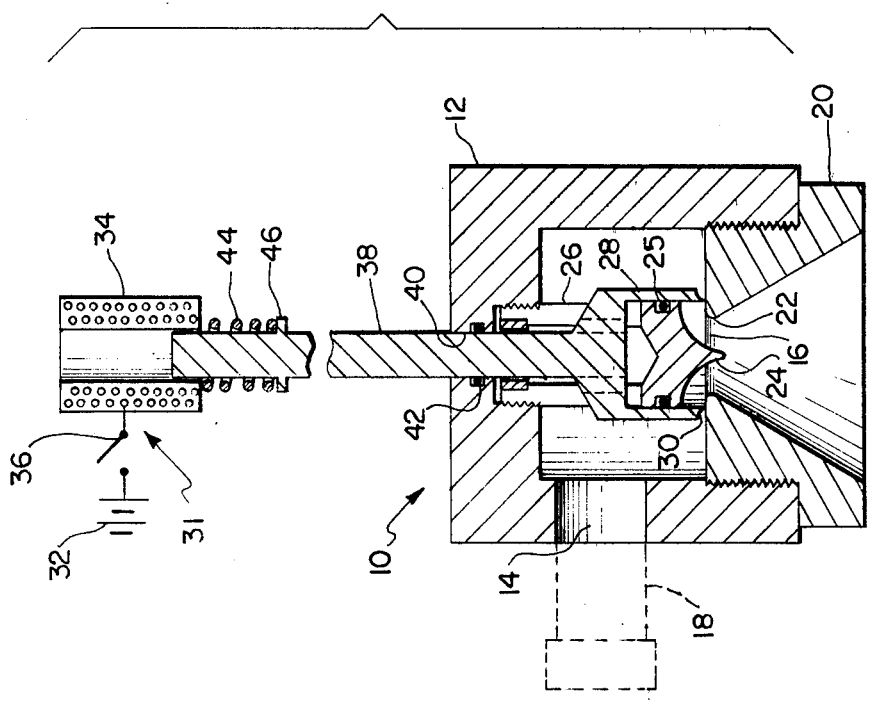
FIG. 2 is a cross-sectional view of the valve showing the gate in the open position.

The valve 10 varies the flow of fluid therethrough by means of a translatable gate 28 disposed within the housing 12 and which closely surrounds the diverter 24. A seal, such as the O-ring seal 25, can be disposed between the gate 28 and the diverter 24 to prevent fluid leakage along their interface. FIG. 1 shows the gate 28 in a closed position while FIG. 2 shows it in an open position. The gate 28 includes a sealing edge 30 which is sized and shaped for, when the gate 28 is in the closed position of FIG. 1, seating against the portion of the housing 12, in this case against the nozzle 20, adjacent the second opening 16 to thereby block the flow of fluid therethrough. When the gate 28 is translated to the open position of FIG. 2, fluid flows past the gate and the diverter 24 and through the second opening 16. The gate 28 can also be positioned at intermediate positions between the open and closed positions to permit a reduced amount of fluid to flow through the second opening.

The valve 10 includes actuation means for effecting translation and positioning of the gate 28 between the open and closed positions. One example of suitable actuation means comprises a solenoid positioner 31 shown in FIGS. 1 and 2. The solenoid positioner 31 comprises an electric power source 32 connected to a coil 34 through a switch 36. The gate 28 includes a stem 38 which extends through the aperture 40 in the housing 12 to the center of the coil 34. The housing 12 can include a seal 42 abutting the stem 38 to prevent leakage. When the switch 36 is open, as in FIG. 1, the coil 34 is deenergized and a spring 44, which is disposed to cooperate with the stem 38, exerts a force against a flange 46 on the stem 38 to translate the gate 28 to and maintain it in the closed position. The spring 44 thus also provides a fail safe feature to the valve in that should the positioner 31 fail, the gate 28 will be closed. When the switch 36 is closed, on the other hand, as is seen in FIG. 2, the positioner 31 is activated, the coil 34 being energized by the electric power source 32. The stem 38, which is made of an appropriate magnetic material, is pulled up into the coil 34 by the electromagnetic field created therein, overcoming the force of the spring 44, thereby translating the gate 28 to the open position. The above described solenoid positioner 31 is presented as an example only and numerous other actuation means can also be employed with the valve 10.

A unique feature of the valve 10 is that the gate 28 has a substantially force balanced configuration. As a result, the valve 10 has high force-gain and thus relatively low powered, lightweight and therefore inexpensive actuation means can be used to quickly translate the gate 28, even under high fluid pressure. The force balancing configuration can best be explained by reference to FIGS. 3 and 4. FIG. 3 shows a typical prior art poppet valve which is not force balanced. $F_1$ represents the actuation force required to open the poppet 48 when the fluid pressure $P_1$ inside the housing 50 is greater than the fluid pressure $P_2$ on the outside of the housing 50. In that case, the opening 52 would be the fluid inlet while the opening 54 would be the fluid outlet. $A_t$ is the total surface area across the poppet, $A_s$ is the area of the stem and $A_o$ is the area of the opening covered by the poppet. In order to open the poppet 48, the actuation force $F_1$ must exceed the force of the fluid pressure $P_1$ acting upon the exposed inner surface area of the poppet 48, $A_t - A_s$.

Where $P_2$ is small relative to $P_1$, as would typically be the case with a fluid valve, the pressure $P_2$ acting upon the exposed outer surface area of the poppet 48, which would equal $A_o$, would offer little assistance to the actuation force $F_1$. Thus, neglecting the effects of $P_2$ and any friction forces involved, the valve actuation means must be capable of providing a force $F_1$ which exceeds the force $P_1(A_t - A_s)$ in order to open the poppet 48.

For comparison, reference is now made to FIG. 4 where there is shown a valve of the present invention which has a force balanced configuration. The housing 12 is filled with fluid and the gate 28 is completely immersed therein. The area of the stem $A_s$ and the total surface area $A_t$ of the gate 28 in FIG. 4 are the same as the corresponding areas $A_s$ and $A_t$ of the poppet 48 of FIG. 3, and the area $A_o$ of the second opening 16 of FIG. 4 is the same as the area $A_o$ of FIG. 3. Likewise, the pressures $P_1$ and $P_2$ are the same for the valves of both figures. However, the configuration of the gate 28 differs significantly from that of the poppet 48 resulting in its being substantially force balanced. The gate 28 is hollow and the diverter 24 which it surrounds is also hollow. The interior of the gate 28 is in fluid communication with the interior of the housing 12 through apertures 56 in the gate 28. Thus, the pressure $P_1$ on the interior of the gate 28 is the same as the pressure $P_1$ in the interior of the housing 12. Briefly referring to FIG. 5, the hollow configuration of the gate 28 and its relationship to the diverter 24 can be more easily seen. The diverter 24 includes elongated slots 58 through a wall thereof aligned parallel to the direction of translation of the gate 28. The gate 28 includes spokes 60 sized and aligned for being received in the slots 58. When the gate 28 is translated between the open and closed positions, the spokes 60 slide within the slots 58. The apertures 56 which provide fluid communication between the interior of the gate 28 and the interior of the housing 12 comprise the open areas between the spokes 60. As will be explained shortly, the equal pressures $P_1$ on both the inside and outside of the gate 28 promotes the force balancing thereof.

Returning to FIG. 4, another feature adding to the force balancing of the gate 28 comprises the sealing edge 30 of the gate 28 being beveled exposing most of the sealing edge to the pressure $P_1$ of the fluid in the interior of the housing 12. The beveled edge could be either straight as is shown or could have a curving, tapered shape, as is shown in FIGS. 1 and 2. Returning to FIG. 4, only the apex of the sealing edge 30 seats against the portion of the housing 12 adjacent the second opening 16 when the gate is in the closed position. Thus, the pressure $P_1$ acts upon both the upper and lower (sealing edge) ends of the sidewall of the gate 28.

Considering the forces which the actuator force $F_1$ must overcome in order to translate the gate 28 to the open position, the component of the exterior pressure $P_2$ parallel to the direction of gate translation acts only upon the fixed diverter 24 and thus has no effect upon gate translation. The area $A_g$ of the gate wall is acted upon by the fluid pressure $P_1$ not only on its upper wall but also upon the beveled sealing edge 30. The area $A_k$ of the spokes 60 is acted upon by the fluid pressure $P_1$ both on the upper and lower surfaces thereof due to the presence of fluid in the interior of and exterior to the gate 28. Finally, only the lower, and not the upper, surface of the area $A_s$ of the stem is acted upon by the fluid pressure $P_1$. Thus, neglecting friction forces, in order to translate the gate 28 to the open position, the actuation force $F_1$ must exceed the force $$P_1A_g - P_1A_g + P_1A_k - P_1A_k - P_1A_s = -P_1A_s$$

That is, all the forces acting upon the gate are balanced by equal but opposite forces except for the force $P_1A_s$ acting upon the lower surface of the stem 38. This force, $P_1A_s$, being in an upward direction, tends to translate the gate to an open position and thus actually assists the actuation means in opening the gate. A spring, similar to the spring 44 shown in FIG. 1, is included in the actuation means to provide a closing force closely balancing the opening force $P_1A_s$. Thus, the gate opening actuation force $F_1$, such as that provided by the energizing of the coil 34 in FIG. 1, can be quite small and the gate 28 can be translated very quickly since the other forces acting upon the gate 28 are in substantial balance. Likewise, since the gate 28 is substantially force balanced in its open, closed and all intermediate positions, the force required to translate the gate in any direction or to maintain it in any position will be very small. Thus, the force required to translate the gate 28 from the open to the closed positions can be provided by the spring configured to exert a downward closing force slightly in excess of $P_1A_s$. The force balancing of the gate 28 also facilitates precise positioning thereof to any desired position. In terms of force-again, the valve output, or movement of the gate 28 against even a high pressure fluid, requires a very low input, or actuation force $F_1$. The force-gain, or ratio of the output force to the input force, is therefore quite high. As a result, the actuation means for the high force-gain valve 10 can be smaller, lighter and less expensive than that which would be required for the prior art poppet valve of FIG. 3 which, as was explained earlier, would have to provide a force exceeding $P_1(A_t - A_s)$ in order to open the poppet 48.

A similar comparison could be made between the prior art poppet valve of FIG. 3 and the high force-gain valve of FIG. 4 when the pressure $P_2$ on the outside of the valve exceeds the pressure $P_1$ on the inside of the valve. The force required to maintain the poppet 48 of FIG. 3 in the closed position would have to be at least $P_2A_o$, while the force required to maintain the gate 28 in the closed position in FIG. 4 would be virtually zero, since the vertical component of $P_2$ acts only upon the diverter 24 which is fixed in position. Thus, the fast reaction valve of FIG. 4 is substantially force balanced whether $P_1$ exceeds or is less than $P_2$, thereby allowing quick opening and closing and precise positioning of the gate 28 using small, light actuation means.

FIGS. 6 through 9 show alternate embodiments of the high force-gain valve of the present invention. In each of these embodiments, the actuation means is shown as comprising a spring disposed to cooperate with either the gate or a stem extending from the gate to urge the gate to translate in a preselected direction. The spring has a spring force selected to permit fluid of a predetermined pressure to overcome the spring force and translate the gate in the opposite direction. Thus, the spring arrangement permits the gate to open and close automatically in response to fluid pressure. It is to be understood, however, that other actuation means, such as, for example, the solenoid positioner 31 of FIGS. 1 and 2, could also be used with these alternative embodiments as well.

Figure 6:
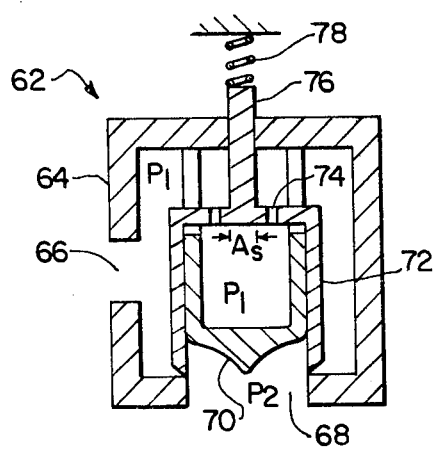
FIGS. 6 through 9 are cross-sectional views of alternate embodiments of the fast reaction valve of the present invention.

Turning to FIG. 6, this embodiment of the high force-gain valve 62 is similar to that shown in FIG. 1 and includes a housing 64 having first and second openings 66 and 68 therein. A hollow diverter 70 is fixedly attached to the interior of the housing 64 on the gate side of the second opening 68 and a hollow, translatable gate 72 closely surrounds the diverter 70, the interior of the gate being in fluid communication with the interior of the housing 64 through apertures 74. The gate 72 includes a stem 76 extending through the housing 64 to a spring 78 which exerts a downward, closing force on the gate. The valve 62 is configured to open automatically when the fluid pressure $P_1$ within the housing 64 exceeds a preselected value. As was explained earlier, the gate 72 is substantially force balanced, the net force on the gate being the fluid pressure $P_1$ acting upon the cross sectional area $A_s$ of the stem 76 in an upward, or gate opening, direction. When it is desired that pressures above a specific pressure $P_1$ automatically open the gate 72, a spring 78 is selected which has a spring force equal to $P_1A_s$. Any pressure above $P_1$ will overcome the spring force and open the gate 72. When the pressure drops below $P_1$, the spring force will force the gate 72 to a closed position.

Figure 7:
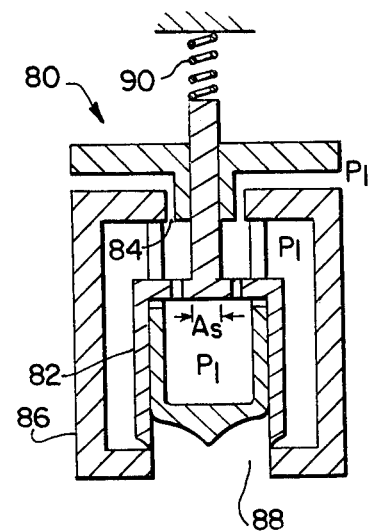

Turning to FIG. 7, there is shown another embodiment of a high force-gain valve 80 which is similar to the valve 62 of FIG. 6 except that the gate 82 and the first opening 84 are configured and cooperate to provide flow feedback to the valve. As the gate 82 is translated toward the open position by the force $P_1A_s$, the upper portion of the gate will begin to block off the first opening 84, reducing the amount of fluid which can flow into the housing 86 while at the same time increasing the amount of fluid which exits the housing through the second opening 88. Thus, the fluid pressure $P_1$ within the housing 86 and gate 82 will decrease, permitting the force of the spring 90 to translate the gate toward the closed position.

Figure 8:
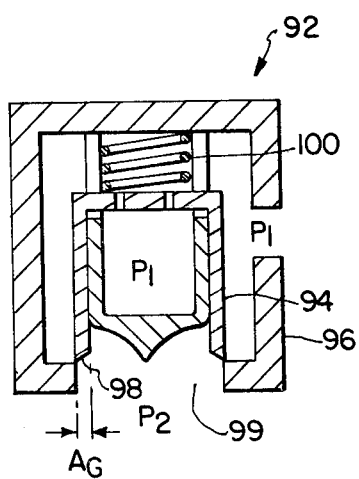

Turning now to FIG. 8, there is shown still another embodiment of a high-force gain valve 92. The valve 92 is configured in the manner of a simple relief valve such that the gate 94 will open when the fluid pressure $P_2$ external to the housing 96 exceeds a preselected value. As can be seen, most of the beveled sealing edge 98 is exposed to the external fluid pressure $P_2$ at the second opening 99 while the corresponding upper edge of the gate is exposed to the pressure $P_1$ within the housing 96. The remainder of the gate 94 is force balanced, being exposed to the pressure $P_1$ on the upper and lower surfaces thereof. The valve 92 also includes a spring 100 disposed between the housing 96 and the upper portion of the gate 94 with a spring force opposing the opening of the gate 94. The fluid pressure $P_2$ will open the gate 94 when $P_2A_g$ exceeds $P_1A_g$ plus the spring force. When $P_2$ then decreases, the gate 94 will be translated to the closed position by the force of the spring 100 and the force exerted by the pressure $P_1$.

Figure 9:
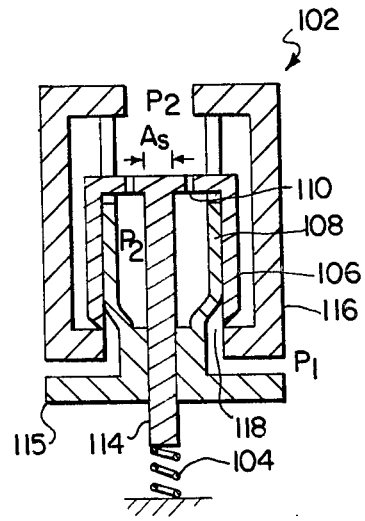

FIG. 9 shows yet another embodiment of the high force-gain valve of the present invention. This valve 102 is configured to maintain the fluid pressure $P_2$ above a minimum preselected value, that minimum value being equal to the spring force of the spring 104 which urges the gate 106 to translate to an open position. The diverter 108, which is fixed in position, and the gate 106 are hollow, the gate 106 including apertures 110 therethrough permitting the upper and lower surfaces, including the sealing edge 112 of the gate 106, to be acted upon by the fluid pressure $P_2$. As was explained for other embodiments of the valve, since the gate 106 is thus substantially force balanced, the net force acting upon the gate is $P_2A_s$ in a direction which tends to close the gate. The spring 104, on the other hand, is disposed to cooperate with the stem 114, which extends downwardly past the spring 118 through an extension 115 of the diverter 108, and urges the gate 106 to open. If the fluid pressure $P_2$ drops below a preselected value, the force of the spring 104 will exceed the force $P_2A_s$ and open the gate 106. Fluid under a pressure $P_1$, which is of a higher pressure than $P_2$, will then enter the interior of the housing 116 through the opening 118 thereby mixing with and increasing the fluid pressure $P_2$ until the force $P_2A_s$ exceeds the force of the spring 104, thus closing the gate 106. The valve 102 thereby maintains the fluid pressure $P_2$ above a certain preselected value.

It is to be understood that this invention is not limited to the particular embodiments disclosed and it is intended to cover all modifications coming within the true spirit and scope of this invention as claimed.

What is claimed is:

1. A high force-gain valve for controlling the flow of fluid therethrough comprising:
    (a) a housing having first and second openings therein, one of said openings being in fluid communication with a source of said fluid;
    (b) a substantially hollow fluid diverter fixed in position within said housing and aligned with said second opening and including elongated slots through a wall thereof;
    (c) a gated disposed within said housing closely surrounding said diverter and having a substantially force balanced configuration, said gate being hollow, the interior thereof being in a fluid communication with the interior of said housing thereby facilitating the force balancing thereof, said gate further being translatable between open and closed positions and including a sealing edge sized and shaped for, when said gate is in said closed position, seating against the portion of said housing adjacent said second opening thereby blocking flow of said fluid therethrough, said diverter being attached to said housing on the gate side of and spaced from said second opening so as to provide an unobstructed fluid flow path through said second opening when said gate is in other than said closed position, said slots in said diverter being aligned to the direction of translation of said gate and said gate further including spokes sized for being received in said slots; and
    (d) actuation means for effecting translation and positioning of said gate between said open and closed positions.

2. The valve of claim 1 wherein said first opening is in fluid communication with said source of said fluid and said sealing edge of said gate is beveled exposing most of said sealing edge to the pressure of fluid within the interior of said housing.

3. The valve of claim 2 wherein said housing is configured such that said second opening comprises the entrance of a nozzle.

4. The valve of claim 2 wherein said gate includes a stem extending through said housing to said actuation means.

5. The valve of claim 4 wherein said actuation means comprises a spring disposed outside of said housing to cooperate with said stem for urging said gate to translate to said open position, the spring force of said spring being selected to permit said fluid of a predetermined pressure to overcome said spring force and translate said gate to said closed position.

6. The valve of claim 4 wherein said actuation means comprises a spring disposed outside of said housing to cooperate with said stem for urging said gate to translate to said closed position, the spring force of said spring being selected to permit said fluid of a predetermined pressure to overcome said spring force and translate said gate to said open position.

7. The valve of claim 1 wherein said second opening is in communication with said source of said fluid and said sealing edge of said gate is beveled and aligned to expose most of said sealing edge to the pressure of fluid outside of said housing.

8. The valve of claim 7 wherein said actuation means comprises a spring disposed between said housing and said gate for urging said gate to translate to said closed position, the spring force of said spring being selected to permit said fluid of a predetermined pressure to overcome said spring force and translate said gate to said open position.

* * * * *